March 17, 1953  M. KELLER  2,631,607
PRESSURE-RELIEF VALVE FOR PRESSURE COOKING VESSELS
Filed Feb. 24, 1948
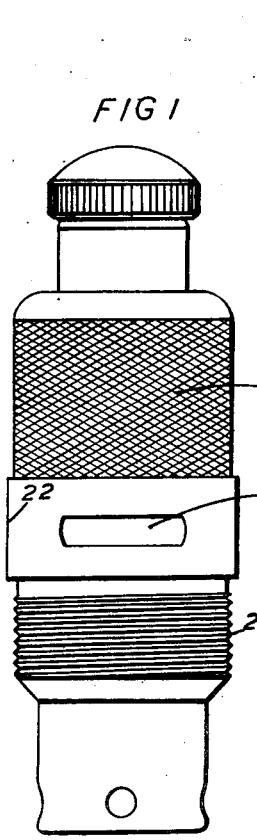
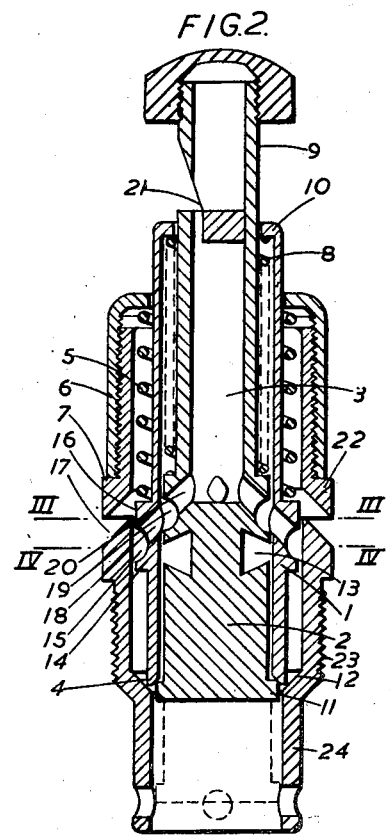
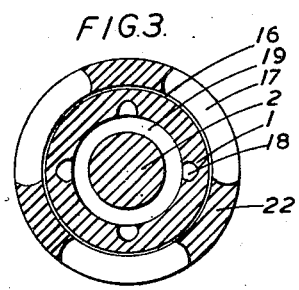
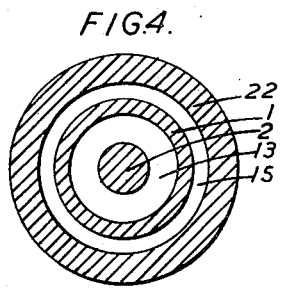
Inventor
Max Keller
By Emery, Holcombe & Blair
Attorneys Patented Mar. 17, 1953

2,631,607

UNITED STATES PATENT OFFICE 2,631,607

PRESSURE-RELIEF VALVE FOR PRESSURE COOKING VESSELS

Max Keller, Zurich, Switzerland

Application February 24, 1948, Serial No. 10,496
In Switzerland May 18, 1946

Section 1, Public Law 690, August 8, 1946
Patent expires May 18, 1966

6 Claims. (Cl. 137—494)

This invention relates to pressure relief valves for pressure cooking vessels or the like.

Pressure cooking vessels must be furnished with valves for relieving the pressure when a predetermined pressure is reached and it is usual also to provide a warning device, which may be visual or acoustic. The pressure-relief valve is generally so constructed that the pressure builds up and then the valve momentarily opens fully and steam escapes in one or more violent jets which are horizontally directed, the valve then shutting again.

One object of this invention is to provide an improved valve for a cooking vessel.

Another object is to provide a valve in which a spring-pressed member is moved under increasing pressure within the vessel to provide a visual signal and at a predetermined pressure picks up a sleeve valve member and moves it to open an escape port or ports.

Yet another object is to provide a sleeve valve member with parts of three different diameters, namely a part making close contact with the interior of a casing and serving normally to close exhaust port or ports completely, a part of lesser diameter having a clearance within the casing and serving to throttle steam passing to the exhaust port or ports until a predetermined movement has taken place and a part of least diameter presenting a piston face to the steam.

A still further object is to combine the valve with devices for giving visual and acoustic warnings of the pressure within the vessel and to construct these devices so that as the pressure increases first the visual and acoustic signals and then the release valve are actuated.

To enable the invention to be clearly understood, the preferred valve according to the invention will now be described by way of example with reference to the accompanying drawings in which—

Figure 1 is a side view of the valve;

Figure 2 is a central axial section; and

Figures 3 and 4 are sections on the lines III—III and IV—IV respectively in Figure 2.

The valve comprises a casing 22 which is screw-threaded at 23 to fit into a tapped opening in the lid of a pressure cooking vessel and which is open at the bottom. The upper part of the casing 22 receives a threaded cap 6 which can be screwed down till it abuts against a shoulder 7 on the casing 22. The casing 22 is also formed with downwardly inclined escape ports 17.

A composite sleeve valve member comprising a piston 2 and a sleeve 1 is mounted to slide in the casing. The stem of the piston is hollow as shown at 3 and is surrounded by a spring 8 which urges the piston downwards relatively to the sleeve. The sleeve has a part 16 which acts as a valve surface in opening and closing the ports 17 and a part 14, of lesser diameter than the part 16, which acts as a throttle member and between which and the casing 22 there is a clearance. The sleeve terminates in a part 4 which in the position shown bears on an inclined surface 12 formed on the inside of the casing 22 and constituting a valve seat. The upper part of the sleeve is surrounded by a spring 5, which is stronger than the spring 8, so that the part 4 of the sleeve is always urged towards the valve seat 12.

The lower end of the piston 2 has a flange 11 which engages under the part 4 and also makes a close fit in the bottom part 24 of the casing 22. Normally the spring 5 urges the piston 2 into the position shown in dotted lines in Figure 2, and the piston remains in this position until pressure is developed in the vessel. The steam formed then acts on the face of the piston and moves it upwards until the position shown in full lines is reached. When this happens the flange 11 strikes the part 4 so that on further increase in pressure with consequent further upward movement of the piston the sleeve is picked up and moved with the piston. Steam can then pass into the space between the lower part of the sleeve and the casing. At least initially this movement is intermittent and when some steam has passed the piston face the composite valve member closes on its seat again until the pressure builds up further.

Between the throttle member 14 and the valve part 16 there is a groove 15, and the steam which passes the piston face enters this and then flows through ports 18 in the sleeve into another groove 19, which is made in the piston. This groove communicates by way of ports 20 with the hollow interior 3 of the piston stem and flows up it to a whistle outlet 21. This outlet is made at the top of the piston stem in a part surrounded by a visual signal in the form of a red band 9, this band being exposed when the piston rises under the steam pressure. Accordingly in the position shown in Figure 2 both a visual signal and an acoustic signal are given. This happens when the contents of the vessel reach boiling point.

If the supply of heat is not immediately reduced and the pressure increases, the groove 18 begins to register with the ports 17 so that the steam escapes downwards through them, but being throttled in the way described escapes gently rather than as sudden violent jets. If the pressure is allowed to increase still further the groove 19 comes fully into register with the ports 17.

Lubrication is effected by packing a groove 13 with a heat-resistant lubricant.

By means of the construction shown the visual and acoustic signals are brought into action at the right time and the acoustic signal does not sound continuously but at intervals. When the cooking process is proceeding properly the parts are in the position shown in Figure 2, i. e. the internal pressure is not enough to lift the composite valve member off the seat 12 against the spring 5, and the acoustic signal is silent.

Although the invention is particularly applicable to pressure-cooking vessels it may be applied to any other pressure vessel from which warning signals are desired.

I claim:

1. In a pressure relief valve, in combination, a casing formed with an inlet opening, a signal port opposite said inlet opening, and at least one exhaust port, a valve member comprising a sleeve member having an end registering with said inlet opening slidable within said casing and having an outer diameter less than the inner diameter of the surrounding casing and defining therewith a passageway between said inlet and exhaust ports and a piston member independently slidable within the sleeve member, said valve member projecting outwardly through said signal port, visual signal means on the outer part of said valve member, a seat for said sleeve member on the inner wall of said casing between said inlet and exhaust ports limiting the movement of said sleeve toward said inlet, first spring means urging said sleeve member toward a position on said seat in which position it obstructs said passageway, interengaging means on said piston and sleeve limiting the movement of said piston with respect to said sleeve in a direction away from said inlet, second spring means urging said piston toward said inlet, to a point beyond that at which it engages the sleeve, so that increased pressure at said inlet first forces said piston to slide relatively to said sleeve thereby exposing the visible signal, and then to engage the sleeve, unseat it, and carry it too away from the inlet, the portion of said piston away from the inlet being hollow and carrying a fluid actuated audible signal, said hollow portion of said piston and said sleeve carrying orifices so positioned relative to each other as to register when said sleeve and piston engage each other so that fluid passing into the casing through the inlet and thence into the passageway between the casing and sleeve member may flow through said orifices and actuate the audible signal.

2. A pressure relief valve as claimed in claim 1 in which said sleeve carries an abutment restricting flow of fluid in the passageway between said inlet and exhaust ports when said sleeve is near its seat, but so positioned on said sleeve as to be carried past said exhaust port after said sleeve is forced from its seat by inlet pressure against the piston member.

3. A pressure relief valve as claimed in claim 2 in which said slidable sleeve member carries a second throttling abutment projecting into the passageway between said inlet passage and exhaust port between said first named abutment and said inlet so as to be carried out of said passageway only after said first named abutment has passed out of it.

4. A pressure relief valve for use on a vessel containing fluid under pressure comprising a casing having an inlet passage for attachment to said vessel, an exhaust port and a signal port, a piston member slidable in a path in said casing, said path terminating in said inlet passage and said piston member carrying a visible signal projecting through said signal port and moving outwardly therethrough so as to exhibit a visible signal when pressure at the inlet port forces the piston member away from the vessel, spring means biasing said piston towards the vessel, a fluid actuated audible signal, passageways from said inlet passage to said audible signal and said exhaust port, a sliding valve member adjacent the path of said piston, a spring member urging said sliding valve member towards a closed position obstructing the passageway between said inlet passage and audible signal, and interengaging means on said piston and sliding valve member so positioned that after the piston has been forced a predetermined distance along its path to expose the visible signal it will engage the sliding valve and further pressure against said piston will open said valve to permit operation of the audible signal by the fluid passing through the passageway thereto, said sliding valve carrying an abutment extending into and limiting the flow through the passageway between the inlet passage and the exhaust valve, said abutment being so positioned on said sliding valve that after a further predetermined movement thereof said abutment passes out of the passageway between said inlet passage and exhaust port to permit passage of fluid therebetween.

5. A pressure relief valve as claimed in claim 4 in which said slidable valve member carries a second throttling abutment projecting into the passageway between said inlet passage and exhaust port, and so positioned on said valve member between said first named abutment and said inlet passage as to be carried out of said passageway between said inlet and exhaust only after said first named abutment has been carried out of said passageway.

6. A pressure relief valve as claimed in claim 4 in which said sliding valve member is a sleeve encircling said piston member.

MAX KELLER.

REFERENCES CITED

The following references are of record in the file of this patent:

UNITED STATES PATENTS

| Number | Name | Date |
|---|---|---|
| 566,997 | McAulay | Sept. 1, 1896 |
| 717,081 | Corrington | Dec. 30, 1902 |
| 935,709 | Turner | Oct. 5, 1909 |
| 1,162,153 | Genscheimer | Nov. 30, 1915 |
| 1,297,239 | Potter | Mar. 11, 1919 |
| 1,668,128 | Ruths | May 1, 1928 |
| 1,807,564 | Blinn | May 26, 1931 |
| 2,051,100 | Nelson | Aug. 18, 1936 |
| 2,297,378 | Wittenberg | Sept. 29, 1942 |
| 2,367,260 | Beddoes | Jan. 16, 1945 |
| 2,398,089 | Fehr | Apr. 9, 1946 |

FOREIGN PATENTS

| Number | Country | Date |
|---|---|---|
| 135,188 | France | of 1929 |
| 491,525 | Germany | of 1930 |